Sept. 6, 1927.  
C. W. LYNCH  
SAND REEL  
Filed Feb. 27, 1926  
1,641,893  
5 Sheets-Sheet 1
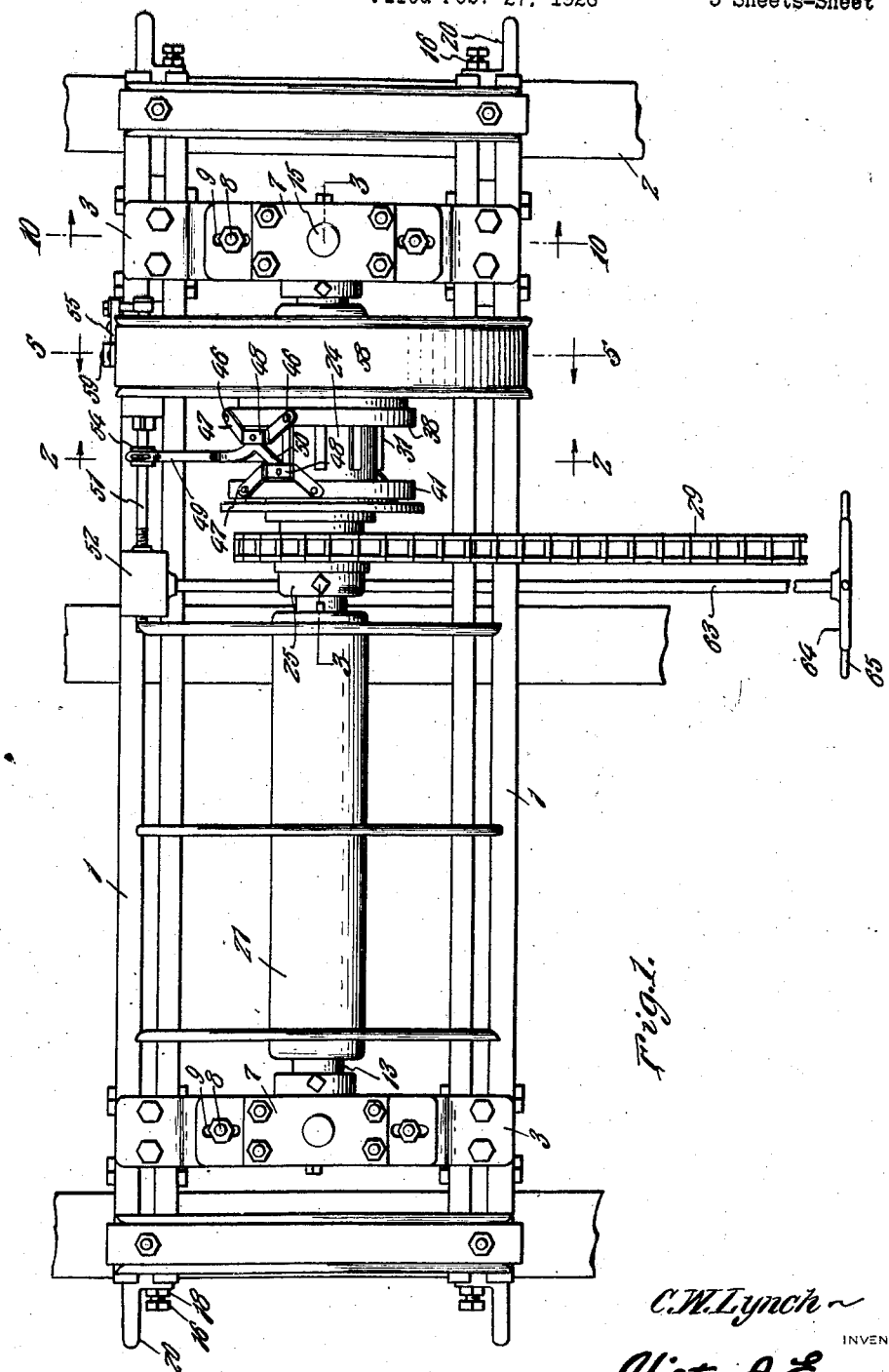

Sept. 6, 1927.

C. W. LYNCH 1,641,893

SAND REEL

Filed Feb. 27, 1926

C. W. Lynch, INVENTOR

BY Victor J. Evans, ATTORNEY

Sept. 6, 1927.
C. W. LYNCH
1,641,893
SAND REEL
Filed Feb. 27, 1926
5 Sheets-Sheet 3
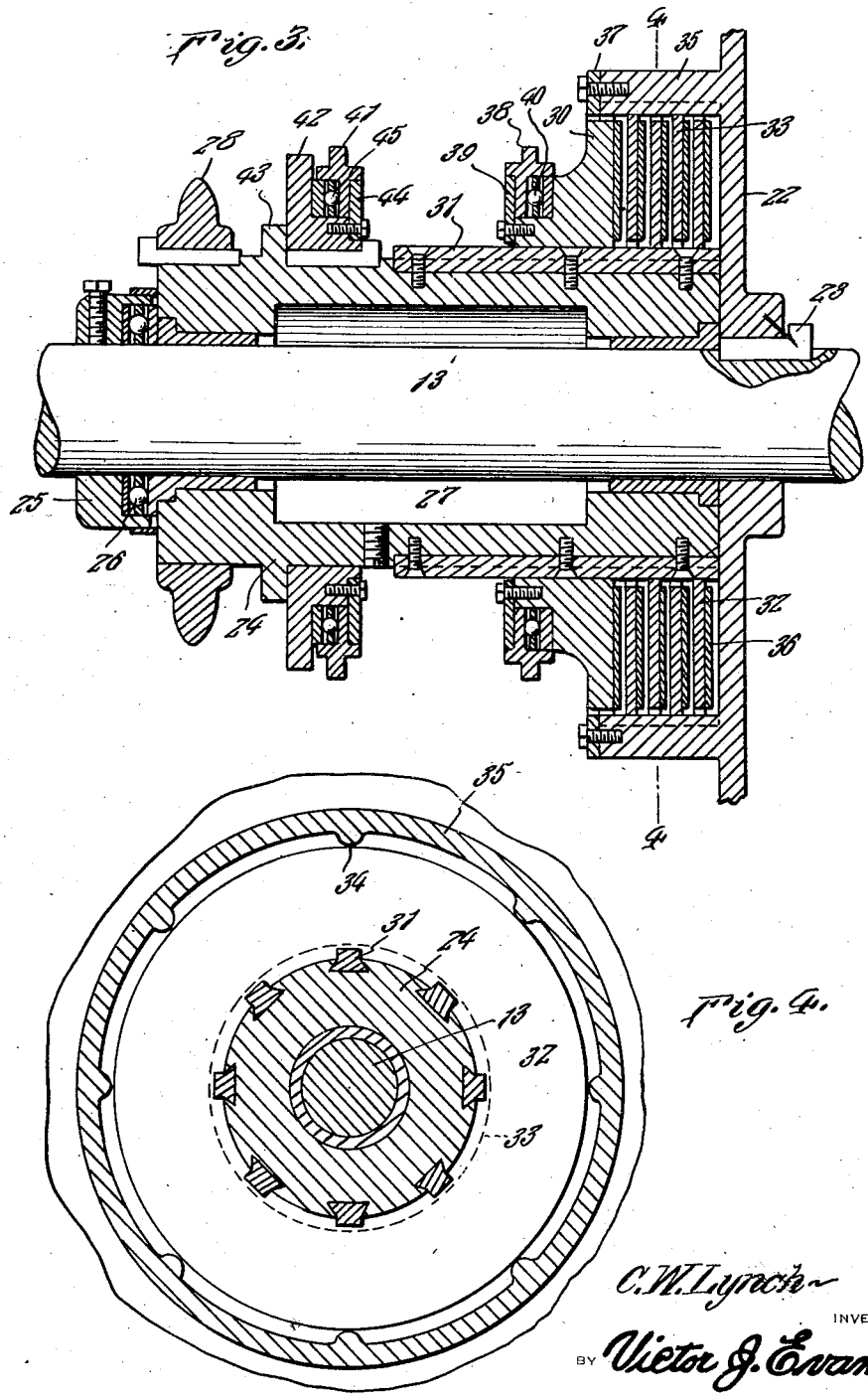

Sept. 6, 1927. 1,641,893
C. W. LYNCH
SAND REEL
Filed Feb. 27, 1926   5 Sheets-Sheet 4
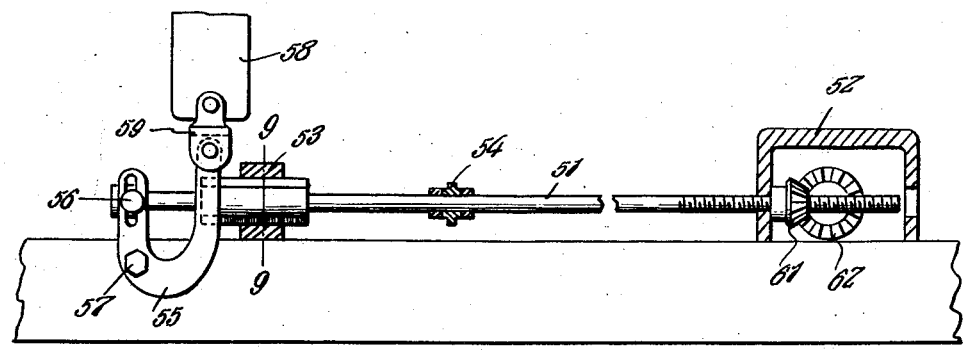
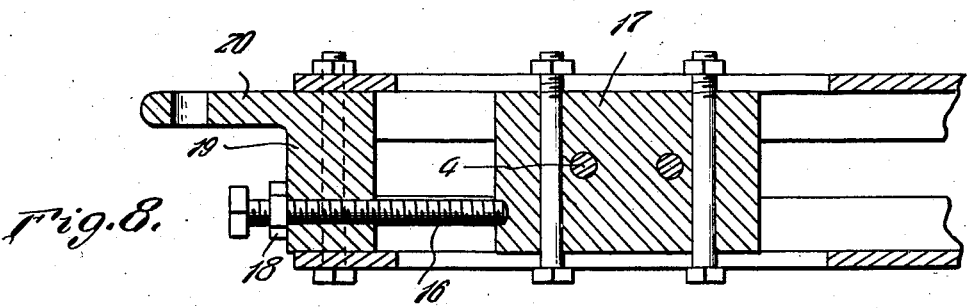
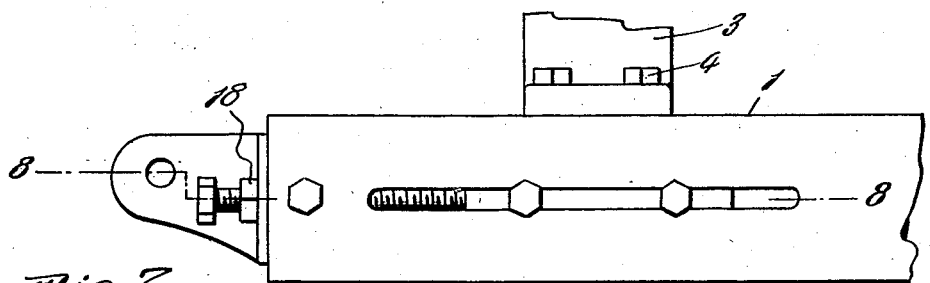
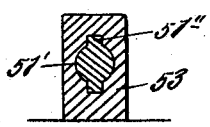

Sept. 6, 1927.
C. W. LYNCH
1,641,893
SAND REEL
Filed Feb. 27, 1926     5 Sheets-Sheet 5
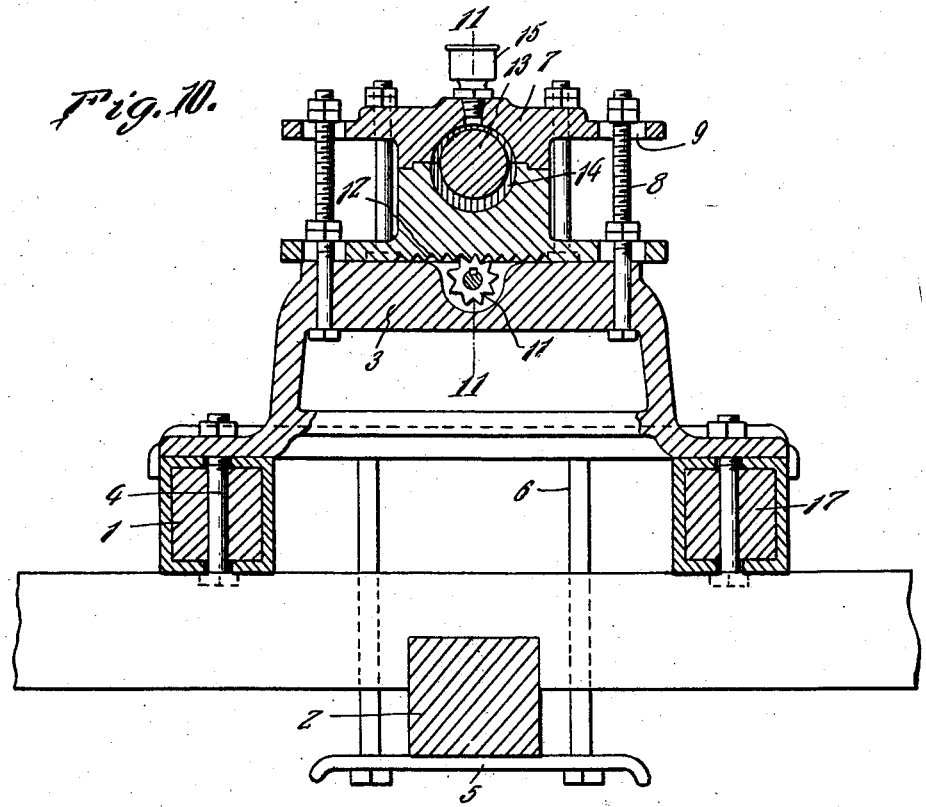
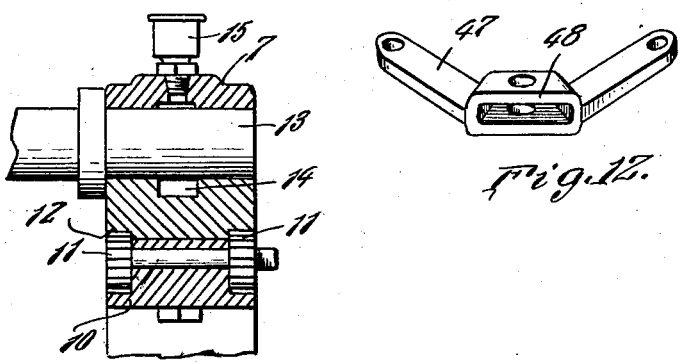
C. W. Lynch
INVENTOR
BY Victor J. Evans
ATTORNEY Patented Sept. 6, 1927.

1,641,893

UNITED STATES PATENT OFFICE.

CHARLES WESLEY LYNCH, OF PERRY, OKLAHOMA.

SAND REEL.

Application filed February 27, 1926. Serial No. 91,156.

This invention relates to oil well drilling apparatus, the general object of the invention being to provide a disk clutch for connecting the drive member to the shaft of the sand reel, with brake mechanism for the reel which is moved to braking position when the clutch is moved to releasing position and vice versa, thus making the reel readily controllable and preventing breaking of the line under unusual circumstances, eliminating sudden jerks or pulls upon the line and permitting the line to be quickly raised or lowered by the reel.

This invention is an improvement over that disclosed in the application filed by me on October 21, 1925, Serial No. 63,954.

Another object of the invention is to so arrange the parts as to minimize adjustments, so that the operators do not have to be continually adjusting the parts and also to so mount the reel on the derrick timbers that undue strains on the frame are eliminated.

A further object of the invention is to provide means whereby the clutch and brake means may be shifted from active to inactive positions very quickly by a partial rotation of a hand wheel.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.

Figure 3 is a section on line 3—3 of Figure 1.

Figure 4 is a section on line 4—4 of Figure 3.

Figure 6 is an elevation, partly in section, of the means for moving the clutch lever and the brake means.

Figure 7 is a view of one corner of the apparatus, showing one of the means for holding the reel longitudinally.

Figure 8 is a section on line 8—8 of Figure 7.

Figure 9 is a section on line 9—9 of Figure 6.

Figure 10 is a section on line 10—10 of Figure 1.

Figure 11 is a section on line 11—11 of Figure 10.

Figure 12 is a view of one of the brackets to which the clutch lever is connected.

Figure 5:
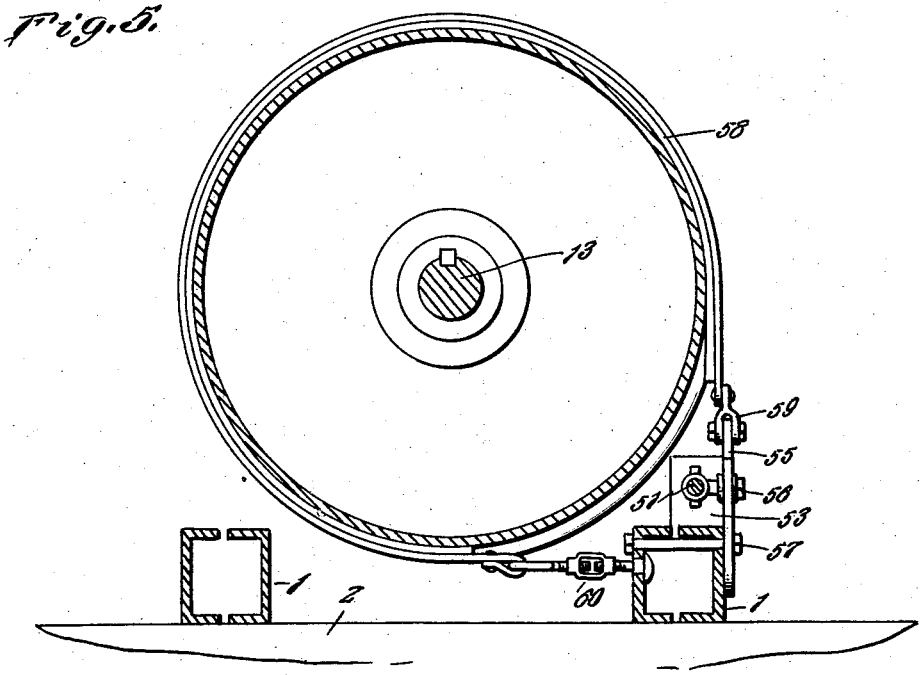
Figure 5 is a section on line 5—5 of Figure 1.
Figure 2:
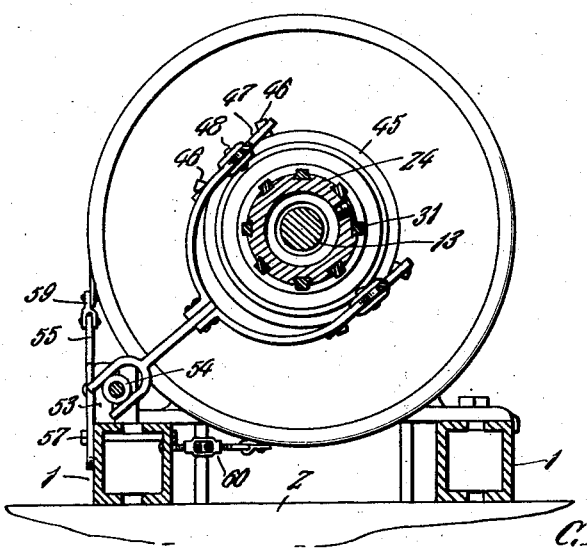
Figure 2 is a section on line 2—2 of Figure 1.

In these views, 1 indicates the supporting frame of the apparatus which is preferably formed of channel iron and which is seated upon the timbers 2 of a derrick or the like. A pair of chairs 3 is bolted to the frame 1 by the bolts 4 and each chair is fastened to a plate 5 which is placed under one of the beams 2, by the long bolts 6. A bearing member 7 is adjustably mounted on each chair by means of the bolts 8 passing through the chair and through slots 9 in the member. Each member can be adjusted laterally, after unloosening the nuts of the bolts 8 through means of the shaft 10 journaled in the chair and having toothed wheels 11 engaging racks 12 on the bearing member so that by turning the shaft with a suitable wrench, the toothed wheels engaging the racks will shift the bearing member laterally. These bearing members support the reel shaft 13. Each bearing member carries the ring 14 and the cup 15 for supplying lubricant to the shaft.

The reel shaft can also be adjusted longitudinally through means of the screw 16 carried by each end of each side member of the frame 1 and engaging a block 17 arranged in each end of each side member, the chairs being bolted to these blocks by the bolts 4. Thus by adjusting the screws, the blocks are moved to adjust the chairs longitudinally on the frame. The screws are provided with lock nuts 18 for holding them in adjusted position. The end pieces 19 which carry the screws 16 are formed with perforated extensions 20 for permitting chains to be attached to the ends of the frame.

The sand reel 21 is fastened to the shaft and a brake drum 22 is also fastened to the shaft, the brake drum being fastened to the shaft by the key 23. A driving sleeve 24 is loosely mounted on the shaft and has one end abutting the brake drum and its other end abutting a collar 25 fastened to the shaft, the collar carrying the thrust bearings 26. The driving sleeve 24 is provided with a lubricant receiving chamber 27 into which lubricant can be supplied in any desired manner, this chamber acting as a reservoir to hold the lubricant so that the supply does not have to be renewed but at infrequent intervals. A sprocket 28 is keyed to one end of the driving sleeve 24 and this sprocket is engaged by the chain 29 which is designed to pass over a sprocket on the driving device of the reel.

A ring member 30 is slidably mounted on the driving sleeve 24 but is held from rotary movement thereon through means of the keys 31 fastened to the driving sleeve and engageing slots in the member 30. Clutch disks 32 are provided with notches in their inner peripheries for slidingly receiving the keys 31 and other clutch disks 33 are provided with notches in their outer peripheries for engaging keys or ribs 34 formed on the inner circumference of a ring-shaped flange 35 carried by the brake drum 22. A lining 36, formed of a composition of asbestos or the like, is fastened to the contacting face of each clutch disk and a similar lining is also carried by the inner face of the ring member 30, this lining increasing the gripping action between the disks and said member 30. A retaining ring 37 is bolted to the edge of the flange 35 for holding the disks 33 in place. This retaining ring also acts to prevent dirt and other foreign matter from entering the chamber occupied by the disks and formed by the flange 35 and the ring member 30. A clutch ring 38 is rotatably carried by the ring member 30 and is held in place by the retaining ring 39 bolted to the member 30, anti-friction bearings 40 being provided for the clutch ring 38. A similar ring 41 is carried by a collar 42 fastened to the driving sleeve 24 and abutting a flange 43 formed on said driving sleeve. This ring 41 is held in place on the collar 42 by the retaining ring 44 and it is also provided with anti-friction bearings 45. Each clutch ring is formed with two pairs of pins 46, each pair supporting a bracket 47 which is of substantially V-shape with a socket 48 at its center. A forked clutch lever 49 has each fork 50 pivoted in the socket 48 of a bracket on the ring 41, and its curved portion pivoted in the sockket of the bracket on the ring 38, so that when the clutch lever 49 is shifted in one direction, it will rock on the brackets 47 of the ring 41 and thus exert a pull on the brackets of the ring 38 so as to move the ring member 30 away from the brake drum and thus separate the clutch disks so that the driving sleeve 24 will be free of the brake drum. When the clutch lever 49 is moved in the other direction, it will push upon the brackets 47 of the ring 38 and thus move the member 30 inwardly to cause the clutch disks to engage each other and thus connect the driving sleeve 24 with the brake drum 22, so that the rotary movement of the driving sleeve 24, imparted to it from the driving means by the chain 29 engaging the sprocket 28, will be transmitted to the brake drum 22 and as this brake drum is keyed to the shaft, the shaft will also be rotated together with the reel. Of course, during this movement, the rings 38 and 41 will remain stationary as they are connected with the lever 49 through the brackets 47.

A shaft 51 is mounted for longitudinal movement at one side of the apparatus, the shaft having a threaded end which passes through a housing 52 supported on the frame and said shaft is provided with an enlarged part 51' adjacent its other end which is formed with the oppositely arranged ribs 51", this enlarged part being slidably supported in a bracket 53 mounted on the frame and having a bore which is of a shape to receive the enlargement and its ribs. This bracket prevents rotary movement of the shaft.

The outer end of the lever 49 is movably attached to the shaft through means of the collar 54 and a U-shaped rocking lever 55 is attached to the shaft at one end thereof by means of the pin and slot connection 56. The lever 55 is pivoted to the frame by the bolt 57 and it is attached to the free end of the brake band 58 of the brake drum by the clip 59. The other end of the brake band is attached to a part of the frame by means of a turnbuckle arrangement 60. A beveled gear 61, having a threaded bore, engages the threaded end of the shaft 51 which is located in the housing 52, said gear being held against longitudinal movement and it meshes with a gear 62 which is fastened to a shaft 63 which extends to a position where the hand wheel 64 thereon can be grasped by an operator standing on the derrick floor. This wheel is preferably formed with the projections 65 so that it can be turned, without danger of slipping, by an operator with oily or greasy hands.

It will be seen that when the gear 61 is rotated by the turning of the shaft and the gear 62, the shaft 51 will be moved longitudinally by the engagement of the internal threads of the gear 61 with the threaded part of the shaft and due to the arrangement of threads and the size of the gears 61 and 62, this longitudinal movement of the shaft is a very rapid one, so that the hand wheel needs but a slight movement to cause considerable movement of the shaft 51. It will also be seen that the movement of the shaft 51 will operate the clutch lever 49 and the brake band lever 55, so that when the clutch is thrown into operative position, the brake will be released and when the clutch is moved into inoperative position, the brake will be applied.

From the foregoing, it will be seen that the reel can be quickly connected with its drive means by the manipulation of the hand wheel 64 and can be just as quickly freed from the drive means by a reverse movement of the hand wheel. It will also be seen that when the parts have been moved, they will remain in their adjusted positions without keeping the hand on the hand wheel, due to the worm connections between the parts. By the disk clutch arrangement and the arrangement of its operating means, the parts may be moved sufficiently to release the clutch and to apply the brake to prevent movement of the reel or the parts can be adjusted to release the clutch without fully applying the brake. This arrangement permits quick control of the sand reel at all times, and when the load to be lifted is light, the clutch parts can be engaged lightly and it will be maintained in this position by the worm connection, as before explained. This will prevent the clutch from gripping and grabbing while being engaged and also makes it release quickly. The clutch will slip under any undue strain and thus prevents breaking of the cable. This arrangement will also permit stopping of the reel quickly or slowly, as desired, without breaking the cable or quick grabbing of the band on the brake drum. The entire reel, shaft and brake drum rotate, but the clutch rings do not and these are provided with anti-friction and thrust bearings, as before explained. These rings receive considerable pressure when the clutch is in engagement, so that the anti-friction bearings prevent excessive wear and the anti-friction bearings between the collar and the end of the driving sleeve also reduce wear. These parts may be lubricated in any desired manner.

The means for permitting the adjustment of the reel and its shaft permits the chain or cable to be loosened or tightened and also permits the parts to be moved when the line is not spooling correctly.

I prefer to make the lining of the clutch disk and the brake lining of asbestos yarn treated to make it oil, heat and water resisting so that it will grip whether it has oil, water or other liquids thereon. These disks have a tendency to separate when the pressure is released, caused by the centrifugal motion of the parts. This practically eliminates wear.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In an apparatus of the class described, a shaft, a driving sleeve rotatably mounted on the shaft, a brake drum keyed to the shaft, a disk clutch for connecting the sleeve and drum together, a clutch lever for manipulating the clutch, a brake band on the brake drum, a lever for operating the same, a longitudinally movable shaft connected with both levers, a gear threaded on the shaft and held against any but rotary movement, a second gear meshing with the first gear, a shaft carrying the second gear and a hand wheel on the shaft.

2. An apparatus of the class described comprising a shaft, a driving sleeve rotatably mounted on the shaft, a brake drum keyed to the shaft, a disk clutch for connecting the sleeve and drum together, a part of the clutch being slidably mounted on the driving sleeve but held against rotary movement thereon, a collar rotatably supported on said part, a collar rotatably supported on a stationary part of the driving sleeve, brackets carried by the collars, a forked clutch lever pivotally connected with the brackets on the collar on the sleeve and engaging the brackets on the collar carried by the clutch part, means for manipulating the lever to move the clutch into operative and inoperative positions, a brake band on the drum and means for actuating the same.

3. An apparatus of the class described, comprising a shaft, means for rotatably supporting the same, a driving sleeve rotatably mounted on the shaft, means for rotating the same, a brake drum keyed to the shaft, a disk clutch for connecting the sleeve and drum together, a clutch lever connected with the clutch, a brake band on the drum, a lever for operating the same, a longitudinally movable member connected with the two levers and manually controlled means for moving said member.

4. An apparatus of the class described comprising a shaft, means for rotatably supporting the same, a driving sleeve rotatably mounted on the shaft, means for rotating the sleeve, a brake drum keyed to the shaft, a ring flange on the brake drum forming a housing, clutch disks keyed to the housing, clutch disks keyed to the driving sleeve and cooperating with the disks carried by the housing, a ring member keyed to the driving sleeve for moving the disk into frictional engagement, a ring rotatably connected with the ring member, a ring rotatably connected with the driving sleeve, anti-friction bearings for said rings, brackets carried by the two rings, a clutch lever connected with the brackets and means for manipulating said lever.

In testimony whereof I affix my signature.

CHARLES WESLEY LYNCH.